(No Model.)
E. MEURER.
PULP SCREEN.
No. 492,039. Patented Feb. 21, 1893.
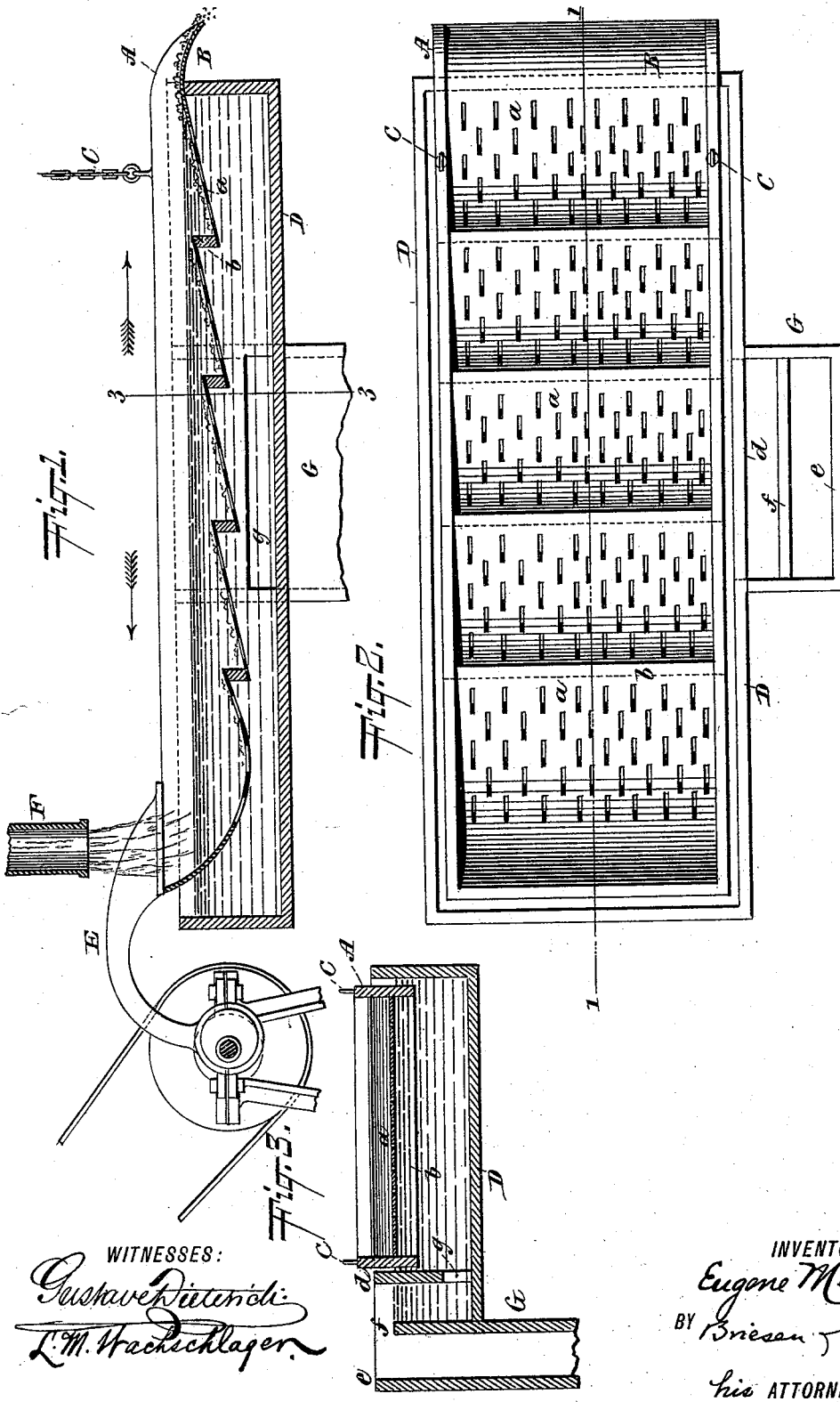
WITNESSES:
Gustave Dieterich
L. M. Wachschlager
INVENTOR
Eugene Meurer
BY Briesen & Knauth
his ATTORNEYS.

UNITED STATES PATENT OFFICE.

EUGENE MEURER, OF PALMER FALLS, NEW YORK.

PULP-SCREEN.

SPECIFICATION forming part of Letters Patent No. 492,039, dated February 21, 1893.

Application filed January 6, 1892. Serial No. 417,174. (No model.)

*To all whom it may concern:*

Be it known that I, EUGENE MEURER, a resident of Palmer Falls, Saratoga county, and State of New York, have invented a new and useful Improvement in Pulp-Screens, of which the following is a full, clear, and exact description.

My invention relates to an improvement in pulp-screens for paper-stock and the like, and consists in the novel arrangement and combination of parts hereinafter described and claimed.

In the drawings Figure 1 is a longitudinal section, on the line 1—1, Fig. 2, of the improved screen; Fig. 2 is a plan view of the screen; and Fig. 3 is a cross-section on the line 3—3, Fig. 1.

A represents the screen provided with a saw-like or step by step inclined bottom B. These steps or sections are formed of inclined perforated portions $a\ a$ and intermediate risers $b\ b$. The inclined sieve portions $a\ a$ ascend from the bottom of risers $b$ on one section to the top of risers $b$ on the next section and the whole bottom ascends from the feed toward the discharge end of the screen. This screen may be in part suspended on flexible supports C in a tank or cistern D partially filled with water. One end of this screen is connected with an eccentric shaft E or analogous agitating contrivance. Above the receiving end of the screen is placed the pipe F for the pulp. The tank has an overflow, as illustrated in Fig. 3, consisting of two walls $d$ and $e$ separated by a partition $f$. The wall $d$ forms one of the walls of the cistern, but is provided with an opening or aperture $g$ at its lower end, through which the water and screened pulp escape and rise in the channel formed between the partition $f$ and wall $d$ to a predetermined height regulated by the height of the partition $f$. The screen A is normally under water.

In operation pulp, mixed with water, is first fed into the receiving end of the screen through the discharge pipe F; the tank D is filled with water to a predetermined height, so as to submerge the screen. The screen is then agitated, and by its action causes the pulp to advance step by step to the discharge end of the screen. As the inclined perforated parts $a\ a$ rise, a certain degree of suction is created sufficient to draw the finer particles of pulp through the bottom of the screen, while the lumpy larger portions creep up until they pass off at the discharge end of the screen.

It is obvious that the form of this screen may be varied somewhat, and that the perforations in the bottom may be of any shape or form to conform to the requirements of each case.

What I claim, and desire to secure by Letters Patent, is—

1. The screen A, constructed with a saw-like bottom, and overflow discharge end the inclined portions $a$ of the bottom ascending toward the discharge end of the screen and being perforated and separated by risers $b$, substantially as herein shown and described.

2. The combination of the screen B having saw-like bottom $a\ b$; and overflow discharge-end whose perforated part $a$ ascends from the bottom of one section to the top of the next section, with the water tank D, and with means substantially as described for agitating said screen, substantially as specified.

3. The combination of the screen B and its saw-like bottom $a\ b$ whose part $a$ ascends from the bottom of one section to the top of the next section, with the tank D having overflow G, and with mechanism substantially as described for agitating said screen while submerged in said tank, all as specified.

EUGENE MEURER.

Witnesses:
R. P. BLOSS,
A. L. PARMENTER.